US009550692B2

(12) United States Patent
Linnot et al.

(10) Patent No.: US 9,550,692 B2
(45) Date of Patent: Jan. 24, 2017

(54) METHOD OF MANUFACTURING A FEEDER CHANNEL FOR MOLTEN GLASS

(75) Inventors: Cyril Linnot, Lyons (FR); Michel Bobo, Saint-saturnin les Avignon (FR)

(73) Assignee: SAINT-GOBAIN CENTRE DE RECHERCHES ET D'ETUDES, Courbevoie (FR)

( * ) Notice: Subject to any disclaimer, the term of this patent is extended or adjusted under 35 U.S.C. 154(b) by 149 days.

(21) Appl. No.: 14/233,992

(22) PCT Filed: Jul. 12, 2012

(86) PCT No.: PCT/IB2012/053580
§ 371 (c)(1),
(2), (4) Date: Feb. 5, 2014

(87) PCT Pub. No.: WO2013/011432
PCT Pub. Date: Jan. 24, 2013

(65) Prior Publication Data
US 2014/0137603 A1 May 22, 2014

(30) Foreign Application Priority Data
Jul. 20, 2011 (FR) ..................... 11 56578

(51) Int. Cl.
*C03B 5/43* (2006.01)
*C03B 7/02* (2006.01)
(Continued)

(52) U.S. Cl.
CPC . *C03B 5/43* (2013.01); *C03B 7/02* (2013.01); *C04B 35/106* (2013.01);
(Continued)

(58) Field of Classification Search
CPC .... C04B 28/02; C04B 20/0076; C04B 22/064; C04B 22/062; C04B 14/06; C04B 14/304; C04B 40/0028; C04B 14/303; C04B 2235/3217; C04B 2235/3244; C04B 41/5155; C04B 7/02; C04B 28/14; C04B 14/30; C04B 14/28; C04B 28/04; C04B 28/342; C04B 28/26; C04B 28/006; C04B 22/06; C03B 7/02–7/06
(Continued)

(56) References Cited

U.S. PATENT DOCUMENTS 3,294,517 A * 12/1966 Fraser ..................... C03B 5/435
373/30
3,561,939 A * 2/1971 Froberg et al. ......... C03B 37/08
65/346
(Continued)

FOREIGN PATENT DOCUMENTS

DE 102006058044 B3 * 1/2008 ............. C03B 5/262
FR 2 458 520 A1 1/1981
(Continued)

OTHER PUBLICATIONS

Gauche; "Les Bétons Réfractaires Autocoulables [Self-Flow Refractory Concretes];" Hommes et Fonderie; Apr. 1993; pp. 17-20.
(Continued)

*Primary Examiner* — Jodi C Franklin
(74) *Attorney, Agent, or Firm* — Oliff PLC

(57) ABSTRACT

Feeder channel for molten glass including an infrastructure including a block self-cast and sintered in situ. Furthermore, a method for manufacturing a block of such an infrastructure and a supply channel for a glassmaking furnace are claimed.

18 Claims, 3 Drawing Sheets

(51) Int. Cl.
*C04B 35/101* (2006.01)
*C04B 35/106* (2006.01)
*C04B 35/626* (2006.01)
*C04B 35/63* (2006.01)

(52) U.S. Cl.
CPC ...... *C04B 35/1015* (2013.01); *C04B 35/6263* (2013.01); *C04B 35/62665* (2013.01); *C04B 35/6303* (2013.01); *C04B 2235/3201* (2013.01); *C04B 2235/3206* (2013.01); *C04B 2235/3208* (2013.01); *C04B 2235/3217* (2013.01); *C04B 2235/3225* (2013.01); *C04B 2235/3232* (2013.01); *C04B 2235/3244* (2013.01); *C04B 2235/3248* (2013.01); *C04B 2235/3418* (2013.01); *C04B 2235/3463* (2013.01); *C04B 2235/526* (2013.01); *C04B 2235/528* (2013.01); *C04B 2235/5212* (2013.01); *C04B 2235/5427* (2013.01); *C04B 2235/5436* (2013.01); *C04B 2235/5445* (2013.01); *C04B 2235/5463* (2013.01); *C04B 2235/6027* (2013.01); *C04B 2235/72* (2013.01); *C04B 2235/77* (2013.01); *C04B 2235/94* (2013.01); *C04B 2235/95* (2013.01); *C04B 2235/9692* (2013.01); *Y02P 40/57* (2015.11)

(58) Field of Classification Search
USPC .................................. 65/135.1, 346
See application file for complete search history.

(56) References Cited

U.S. PATENT DOCUMENTS

| | | | | |
|---|---|---|---|---|
| 3,567,473 A * | 3/1971 | Drever et al. | .......... | C04B 35/48 501/104 |
| 3,798,017 A * | 3/1974 | Classen | .................. | C03B 18/18 65/186 |
| 3,885,005 A * | 5/1975 | Downing | ................ | B22F 3/222 264/125 |
| 4,044,815 A * | 8/1977 | Smashey | .................. | B22C 9/04 164/244 |
| 4,308,067 A * | 12/1981 | Guigonis | .................. | C03B 5/43 501/105 |
| 4,585,486 A * | 4/1986 | Fujita | .................. | C04B 24/2623 106/674 |
| 4,662,927 A * | 5/1987 | Blumenfeld | .............. | C03B 7/06 65/135.1 |
| 4,978,859 A * | 12/1990 | Ransheim | ............ | G01B 11/024 250/559.21 |
| 5,378,279 A * | 1/1995 | Conroy | .............. | C04B 20/0076 106/719 |
| 7,074,733 B2 * | 7/2006 | Guigonis | ................ | C04B 35/66 501/105 |
| 7,943,541 B2 * | 5/2011 | Avedikian | ............. | C04B 35/105 501/105 |
| 8,455,380 B2 * | 6/2013 | Consales | .................. | C03B 5/43 106/802 |
| 8,505,335 B2 * | 8/2013 | Connors, Sr. | ......... | C04B 35/106 65/27 |
| 8,505,336 B2 * | 8/2013 | Connors, Sr. | ............. | C03B 5/43 65/27 |
| 2004/0208079 A1 * | 10/2004 | Hein | ........................ | B01F 9/02 366/6 |
| 2007/0089460 A1 * | 4/2007 | Lindig | .................. | B01F 5/0646 65/135.3 |
| 2008/0196449 A1 * | 8/2008 | Addiego | ................ | C01B 31/24 65/17.3 |
| 2009/0091051 A1 | 4/2009 | Champion et al. | | |
| 2009/0165500 A1 * | 7/2009 | Luebbers | .................. | C03B 5/43 65/32.5 |
| 2010/0101275 A1 * | 4/2010 | Abensour | ................ | C03C 1/10 65/32.3 |
| 2011/0219987 A1 * | 9/2011 | Consales | .................. | C03B 5/43 106/802 |
| 2013/0167592 A1 * | 7/2013 | Linnot | ..................... | C03B 5/43 65/374.13 |

FOREIGN PATENT DOCUMENTS

| | | | | |
|---|---|---|---|---|
| FR | 2 894 957 A1 | 6/2007 | | |
| FR | 2 937 636 A1 | 4/2010 | | |
| JP | 01212235 A * | 8/1989 | | |
| JP | A 8-57820 | 3/1996 | | |
| JP | A 11-71117 | 3/1999 | | |
| MX | WO 2009051461 A1 * | 4/2009 | .......... | C03B 5/2375 |
| WO | WO 2004/065327 A2 | 8/2004 | | |
| WO | WO 2008157533 A1 * | 12/2008 | .............. | C03B 5/43 |

OTHER PUBLICATIONS

Pileggi et al; "High Performance Refractory Castables: Particle Size Design;" Refractories Applications and News; Sep./Oct. 2003; vol. 8; No. 5; pp. 17-21.

Myhre; "The effect of particle-size distribution on flow of refractory castables;" The American Ceramic Society 30$^{th}$ Annual Refractories Symposium; St. Louis, Missouri; Mar. 25, 1994.

Dunkl; "Feurfeste Werkstoffe im Kontakt mit der Glasschmelze [Refractory Materials in Contact with the Glass Melt];" In: HVG: "Fortbildungskurs 1998: Feuerfeste Werkstoffe für die Glasindustrie und deren Prüfung [Training Course 1998: Refractory Materials for the Glass Industry and Its Exam]"; Jan. 1, 2005; pp. 24-25, 38; XP-002668505.

Feb. 1, 2012 Preliminary Search Report issued in French Patent Application No. 1156578 (with translation).

Feb. 1, 2012 Written Opinion issued in French Patent Application No. 1156578 (with translation).

Oct. 25, 2012 Search Report issued in International Patent Application No. PCT/IB2012/053580 (with translation).

Oct. 25, 2012 Written Opinion issued in International Patent Application No. PCT/IB2012/053580 (with translation).

* cited by examiner

METHOD OF MANUFACTURING A FEEDER CHANNEL FOR MOLTEN GLASS

TECHNICAL FIELD

The invention relates to a feeder for molten glass, a method for manufacturing an infrastructure block of such a feeder, and a method for manufacturing such a feeder.

PRIOR ART

As shown in FIG. 1, a feeder 2 for molten glass conventionally comprises an infrastructure 4 formed by joining sintered refractory blocks 5, and a superstructure 6 formed by joining sintered refractory blocks 7. As shown in FIG. 2, a feeder infrastructure block 5 has the shape of a "U" section comprising a base 12 from which two jambs 14a and 14b extend, substantially perpendicular to the base 12. The length or "pitch" L of the infrastructure block is typically about 610 mm, its width I is between 900 mm and 2100 mm, and its height h is about 300 mm.

The feeder infrastructure blocks which come into contact with the molten glass must meet very severe requirements.

The feeder is in fact the terminal portion, through which the conditioned, that is to say "ready for use", molten glass passes. Any defect generated in the feeder has a high probability of leading to scrap in the glass articles, unlike defects generated upstream in the furnace. The latter are in fact subjected to much higher temperatures than those obtaining in the feeder. Furthermore, they are subjected to these temperatures for much longer than the defects generated in the feeder. The probability of these defects being eliminated is therefore higher than for the defects generated in the feeder.

The stresses of the blocks in contact with the molten glass are also very different from those of blocks placed in contact with a molten metal, especially with regard to corrosion mechanisms.

Conventionally, to manufacture the infrastructure blocks, a starting batch is shaped by pressing, or by casting, with or without vibrations. In particular, when a casting method is used, an inverted U-shaped mold can be filled by gravity with the starting batch, via the face of the mold corresponding to the "back" on which the infrastructure block rests during its use. The surface intended to come into contact with the molten glass, called the "contact surface" 16, is thereby preserved. In particular, since the preform is in the opposite position to its service position, the bubbles rise away from the upper surfaces 18a and 18b of the jambs and from the bottom surface 20 of the base 12. Thus they do not affect the contact surface 16 bounded by the bottom surface 20 and the portions of the internal surfaces 22a and 22b of the jambs 14a and 14b, respectively, which extend from the bottom surface 20 to the float line N of the molten glass.

To construct the feeder infrastructure, the blocks are arranged edge to edge without a bonding cement.

The assembly of the blocks is a delicate and lengthy operation.

A permanent need exists for a method for manufacturing a feeder more rapidly.

It is the object of the invention to satisfy this need.

SUMMARY OF THE INVENTION

According to the invention, this aim is achieved by means of a feeder for molten glass comprising an infrastructure comprising a block self-cast in situ and sintered in situ, herebelow "block according to the invention".

Although self-casting is a feature of the method, a skilled person can easily determine whether an infrastructure block is self-cast: in fact, the construction of an infrastructure block by self-casting in situ implies that the block being manufactured is positioned with the U opening upward, contrary to the prior art described above. An infrastructure block self-cast in situ according to the invention therefore has a casting face at the upper surface of the jambs of the block. In fact, a casting face has an appearance that makes it immediately identifiable by a skilled person. In particular, it does not have the imprint of the mold, but characteristic casting lines (striations).

The analysis of the block microstructure also serves to check whether a block has been sintered.

The construction of at least part of a feeder by self-casting in situ advantageously serves to manufacture large blocks.

Advantageously, manufacture by self-casting can therefore be carried out rapidly.

Furthermore, according to the conventional technique, two adjacent blocks are separated by a space, or "joint" 23. The joint is an area that is particularly vulnerable to attack by the molten glass. Damage to the blocks at the joints is therefore liable to reduce the service life of the feeder and to generate defects which reduce the manufacturing yield of the glass articles. This damage is especially important if the joints are caused to open under the effect of temperature.

Manufacture by self-casting advantageously serves to limit the number of joints.

A particular embodiment consists in casting the block in the metal casing in which the block is placed. A casing is conventionally designed to protect and support the feeder. The length of the block may be equal to that of the casing in which it is placed. Preferably, all the blocks of a casing are cast simultaneously, thereby advantageously serving to shorten the production time.

As shown in greater detail in the rest of the description, the inventors have succeeded in manufacturing an infrastructure block by self-casting in situ and sintering in situ, despite the drawbacks conventionally associated with the in situ implementation of the these techniques:

In particular, the positioning of the block during manufacture with the U opening directed upward tends to cause the bubbles to rise to the working surface and therefore to damage this surface.

Moreover, sintering quality is properly controlled in a kiln. On the contrary, an in situ sintering is generally carried out during heating-up at a lower temperature than in a kiln. Moreover, the arrangement of the blocks sintered in situ conventionally gives rise to heterogeneous temperatures in the blocks during the sintering, the faces in contact with the interior of the feeder being heated to higher temperatures than the other faces. This results in a variability of the quality of sintering in the blocks.

Thanks to the manufacturing method according to the invention described below, the inventors have succeeded in overcoming these obstacles.

A molten glass feeder according to the invention may further have one or more of the following optional features:
  Said infrastructure consists entirely of blocks self-cast in situ and sintered in situ;
  Said feeder comprises a superstructure consisting at least partly, preferably entirely, of blocks cast, or even self-cast, in situ and sintered in situ;

Said block comprises a base and a jamb extending from said base to a free end bounded by an upper surface having the appearance of a casting face;

Said block preferably comprises two jambs, and even more preferably, has the shape of a U-section;

Said block weighs more than 600 kg, or even more than 800 kg, or even more than 1200 kg, or even more than 1600 kg, or even more than 2400 kg, or even more than 3200 kg, or even more than 4000 kg;

Said block has a length, measured along the longitudinal direction of the feeder (axis X in FIG. 4), that is greater than 0.7 m, greater than 1 m, greater than 1.5 m, greater than 2 m, greater than 3 m, greater than 4 m, or even greater than 5 m;

Said block comprises grains and a hydraulic binder, preferably a cement, preferably based on an alumina cement, that is to say, containing more than 65% alumina, preferably more than 75% alumina, in percentage by weight in relation to the oxides;

The content of hydraulic binder, in particular of alumina cement, is higher than 2%, or even higher than 3%, or even higher than 4%, or even higher than 5% and/or lower than 8%, preferably lower than 7%, preferably lower than 6%, in percentage by weight in relation to the oxides;

Said block comprises more than 80%, preferably more than 85%, preferably more than 90%, preferably more than 95%, preferably more than 98%, preferably more than 99%, preferably substantially 100% of oxides, in relation to the weight of the block;

Said block has a composition such that the total $Al_2O_3+ZrO_2+SiO_2+CaO+MgO+TiO_2+Y_2O_3$ content is higher than 90%, preferably higher than 95%, preferably higher than 98%, preferably higher than 99%, in percentage by weight in relation to the oxides.

In a first particular embodiment, said block has a total $Al_2O_3+SiO_2+CaO+Y_2O_3$ content higher than 90%, preferably higher than 95%, preferably higher than 98%, preferably higher than 99%, in percentage by weight in relation to the oxides. Said block may in particular have the following composition, in relation to the weight of the oxides and for a total of 100%:

$Al_2O_3>80%$, preferably $Al_2O_3>85%$, preferably $Al_2O_3>90%$, $SiO_2<10%$, preferably $SiO_2<8%$, preferably $SiO_2<7%$ and, preferably $SiO_2>2%$, preferably $SiO_2>3%$, preferably $SiO_2>5%$, $CaO<5%$, preferably $CaO<4%$, preferably $CaO<3%$, preferably $CaO<2%$, preferably $CaO<1%$ and, preferably $CaO>0.3%$, preferably $CaO>0.5%$, $Y_2O_3<5%$, preferably $Y_2O_3<3%$ and, preferably $Y_2O_3>1%$, preferably $Y_2O_3>2%$, other oxides <5%, preferably "other oxides" <3%.

In a second particular embodiment, said block has a total $Al_2O_3+ZrO_2+SiO_2+CaO+Y_2O_3$ content higher than 90%, preferably higher than 95%, preferably higher than 98%, preferably higher than 99%, in percentage by weight in relation to the oxides. Said block may in particular have the following composition, in relation to the weight of oxides and for a total of 100%:

$Al_2O_3<85%$, or even $Al_2O_3<80%$ and, preferably $Al_2O_3>45%$, or even $Al_2O_3>50%$, or even $Al_2O_3>60%$, $SiO_2<25%$, or even $SiO_2<20%$ and, preferably $SiO_2>5%$, or even $SiO_2>10%$ $ZrO_2<35%$, or even $ZrO_2<30%$, or even $ZrO_2<25%$, or even $ZrO_2<21%$, or even $ZrO_2<17%$, or even $ZrO_2<13%$, and preferably $ZrO_2>8%$, preferably $ZrO_2>10%$, $CaO<5%$, preferably $CaO<4%$, preferably $CaO<3%$, preferably $CaO<2%$ and, preferably $CaO>0.3%$, preferably $CaO>0.5%$, $Y_2O_3<5%$, preferably $Y_2O_3<4%$ and, preferably $Y_2O_3>1%$, preferably $Y_2O_3>2%$, other oxides <5%, preferably "other oxides" <3%.

The invention further relates to a glassmaking furnace comprising a molten glass feeder according to the invention. It relates in particular to a glassmaking furnace comprising a feeder for molten soda lime glass according to the invention.

The invention further relates to a method for manufacturing a block of an infrastructure of a feeder for a glassmaking furnace according to the invention, said method comprising the following steps:

a) preparation of a self-castable unshaped product, activated and degassed under partial vacuum, b) preparation, at the place where said block is intended to be used, of a mold corresponding to the shape of said block, c) bottom feed of the mold, with removal of bubbles located at the surface of said self-castable unshaped product, activated, degassed and introduced into said mold, corresponding to the surface of said block intended to come into contact with molten glass;

d) hardening of said self-castable unshaped product, activated, degassed and introduced into said mold in order to form a preform;

e) optionally, mold release of said preform;

f) heating-up in order to dry and sinter said preform.

Such a method therefore involves:

the conventional preparation of an unshaped activated self-castable product;

degassing;

bottom feed; and means for at least partly absorbing the bubbles that rise and appear at the surface of the unshaped product which will, in service, come into contact with molten glass.

When these four conditions are satisfied, the inventors have discovered that it is possible to manufacture a block self-cast in situ and sintered in situ, which has a contact surface with the molten glass that is of equivalent quality to that of the factory-cast and kiln-sintered blocks of the prior art.

Finally, said method serves to manufacture large blocks, thereby reducing the number of joints, and hence increases the service life of the feeder.

The length of the manufactured blocks and the presence of a casting face at the free end of at least one of the jambs of the block may constitute signatures of the manufacturing method according to the invention.

The invention further relates to a method for manufacturing a feeder for a glassmaking furnace comprising the following steps:

A. manufacture, using a manufacturing method according to the invention, of an infrastructure block comprising a base and two jambs, preferably a U-section;

B. optionally, assembly of one or more burner blocks above at least one of said jambs;

C. installation of a mold having a shape adapted to the manufacture of a superstructure block;

D. casting of an unshaped product in said superstructure mold.

As shown in greater detail in the rest of the description, said method serves to manufacture the feeder rapidly.

Preferably, a core used to define an internal surface of said infrastructure block is used to define an internal surface of a superstructure block placed above said infrastructure block.

Preferably, an infrastructure block and a superstructure block are cast simultaneously.

The invention finally relates to the use of an self-castable unshaped product for the in situ manufacture of a block of a feeder of a glassmaking furnace intended to come into contact with molten glass, in particular with soda lime glass.

DEFINITIONS

"Particulate mixture" means a dry mixture of particles (not bonded together).

"Particle" means a solid object within a particulate mixture.

The "size" of a particle is the mean of its largest dimension dM and its smallest dimension dm: (dM+dm)/2. The size of the particles of a particulate mixture is conventionally evaluated by a characterization of the particle size distribution carried out with a laser particle size analyzer. The laser analyzer may, for example, be a Partica LA-950 sold by HORIBA.

The percentiles or "centiles" 10 ($D_{10}$), 50 ($D_{50}$), 90 ($D_{90}$) and 99.5 ($D_{99.5}$) of a particulate mixture are the sizes of particles corresponding to the percentages, by weight, of 10%, 50%, 90% and 99.5% respectively, on the cumulative particle size distribution curve of the particles of the particulate mixture, the particle sizes being classed by increasing order. For example, 10% by weight of the particles have a size lower than $D_{10}$ and 90% by weight of the particles have a size higher than $D_{10}$. The percentiles can be determined by means of a particle size distribution carried out using a laser particle size analyzer.

"Maximum size" is the 99.5 percentile ($D_{99.5}$) of said powder.

"Median size" is the percentile $D_{50}$, that is to say, the size dividing the particles into first and second equal-weight populations, said first and second populations only comprising particles having a size higher, or lower, respectively, than the median size.

"Sphericity" of a particle means the ratio of its smallest diameter to its largest diameter, regardless of the way in which said sphericity has been obtained.

A particle is said to be "non-granulated" when it is not formed by a granulation of grains, by conventional granulation or by atomization in particular.

"Unshaped product" or "unformed concrete" is a mixture of wet particles capable of setting in order to constitute a shaped product. The unshaped product is "activated" when in a setting process. The activation conventionally results from a wetting with water or another liquid.

A self-castable unshaped product is an unshaped product that has the ability to flow under its own weight, without external mechanical action of the vibration type, and without segregation. The absence of segregation implies a limited water content. The castability value is measured according to the general teaching of standard ASTM C1446-99, using a hollow truncated cone with bases of 70 and 100 mm and a height of 80 mm, with a mixing time of 15 minutes, the value after spreading, in mm, being measured 5 minutes after the lifting of the cone, the castability value being the mean, in two perpendicular directions, of the dimensions of the spread activated unshaped product. The castability of a self-castable unshaped project is higher than 270 mm.

Self-castable unshaped products have been used for over 20 years and are well known to the skilled person. They may have very different compositions. They are, for example, described in the article "Les bétons réfractaires autocoulables", Hommes et Fonderie—April 1993, pages 17 to 20. FR 2 937 636 also describes self-castable, or "self-leveling" unshaped products.

The particle size distribution of a self-castable unshaped product can be determined in particular by means of mathematical forecasting models, for example using the Andréasen compaction model, as described in "High performance refractory castable: particle size design", Refractories Applications and News, Vol. 8, No. 5, pages 17 to 21 (2003) or in "The effect of particle-size distribution on flow of refractory castables", The American Ceramic Society 30th Annual Refractories Symposium, Mar. 25, 1994.

A pumpable unshaped product is an unshaped product which has the capacity to be conveyed by pump, and therefore to avoid being destructured during its passage through said pump.

Self-castability and pumpability are two different properties. In particular, a pumpable unshaped product is not necessarily self-castable. For example, the product of comparative example 2 described below is not self-castable, because it undergoes segregation during casting, but is pumpable because it can be placed using a pump.

"Shaped product" or "shaped concrete" is a solid material having a microstructure that consists of an aggregate in which the grains are joined.

"Aggregate" is a set of refractory grains of which at least 90% by weight have a size between 50 μm and 15 mm.

In a shaped product, the "size" of a grain is the mean between its largest dimension and its smallest dimension, said dimensions being measured on a cross-section of said product.

A preform is an example of a shaped product, obtained by the setting of a particulate mixture, generally by wetting with water. The grains therein are bonded by means of a bonding phase, which may be temporary.

A sintered product is another example of a shaped product, obtained by sintering a preform. The grains therein are bonded by means of a "matrix", that is to say, a phase that may be crystallized or not, providing a continuous phase between the grains, and resulting from the sintering. The "matrix" must be distinguished from the bonding phase optionally present before sintering, for example due to the activation of a hydraulic binder.

"Block" means a shaped product obtained by casting an unshaped product (unlike a liner).

The "in situ" casting or "casting in place" of a block is a casting carried out at the precise location where the block is to be used (service position). An in situ casting serves to manufacture large blocks, which cannot be shifted subsequently. An in situ casting therefore generally implies that the sintering is also carried out in situ.

A "bottom" feed of a mold or casting is a feed whereby the unshaped product flows from the bottom of the mold to the top of the mold. In other words, the unshaped product entering the mold is introduced below the unshaped product already present in the mold.

Heating-up is the first temperature rise of a glassmaking furnace.

"Sintering" is a heat treatment whereby refractory particles of a preform are converted to form a matrix that bonds other particles of said preform together.

"Refractory material" means a material having a melting or dissociation point higher than 1000° C.

"Fibers" are elongated structures, typically having a diameter of 0.1 µm to 2 mm and a length of up to about 3 cm.

The oxide contents are related to the total contents for each of the corresponding chemical elements, expressed in the form of the most stable oxide, according to the usual convention in the industry.

Unless otherwise indicated, all the oxide contents of the products according to the invention are percentages by weight expressed in relation to the oxides.

"Containing a", "comprising a" or "comprising one" means "comprising at least one", unless otherwise indicated.

BRIEF DESCRIPTION OF THE FIGURES

Other features and advantages of the invention will appear from a reading of the detailed description that follows and the examination of the appended drawing in which.

In the various figures, identical or similar members have the same reference numeral.

DETAILED DESCRIPTION

Manufacture of a Block

Figure 1:
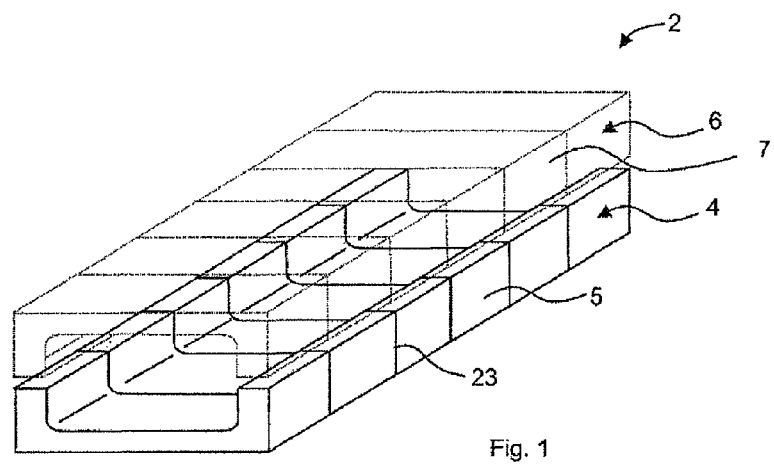
FIGS. 1 and 4 show, in perspective and at the same scale, a feeder according to the prior art and according to the invention, the superstructure being shown by dotted lines for the clarity of the figure.

A block according to the invention can be manufactured following steps a) to f) above.

The preparations of the mold and of the unshaped product can be carried out independently.

Step a): Preparation of the Unshaped Product

To make an unshaped product self-castable, all known techniques for preparing self-castable unshaped products can be employed. Preferably, the manufactured unshaped product has a castability value, measured as described above, higher than 300 mm.

To activate an unshaped product, various components are conventionally blended in a mixer, and in particular a particulate mixture of refractory particles, a binder, water and, preferably, a surfactant additive, or even a set accelerator or a set retarder.

These components together preferably account for more than 90%, more than 95%, or even substantially 100% of the unshaped product.

All the compositions of particulate mixtures of refractory particles used to manufacture infrastructures of glassmaking furnace feeders can be considered.

In a manner well known to the skilled person, the composition of the particulate mixture is adapted to the desired composition for the block to be manufactured. In particular, the refractory oxides present in the unshaped product are found, substantially in their totality, in the sintered block.

Preferably, the particulate mixture of refractory particles comprises 90% to 99% of particles of at least one refractory material in which the main component or components are alumina ($Al_2O_3$) and/or zirconia ($ZrO_2$) and/or silica ($SiO_2$).

Various refractory materials can be used, originating for example:

from fused-cast refractory materials such as ER-1681 or ER-1711 produced and sold by Société Européenne des Produits Réfractaires. The two products contain in percentage by weight, in relation to the oxides: 32 to 54% $ZrO_2$, 36 to 51% $Al_2O_3$, 10 to 16% $SiO_2$ and 0.2 to 1.5% $Na_2O$;

from fused mullite refractory materials, for example a powder that contains 76.5% $Al_2O_3$ and 22.5% $SiO_2$;

from high-zirconia-content materials, such as zirconia CC10 sold by Société Européenne des Produits Réfractaires. This product contains more than 99% $ZrO_2$ and the median size ($D_{50}$) of the zirconia particles is 3.5 µm;

from reactive alumina, or a mixture of reactive aluminas, containing more than 99% $Al_2O_3$, the median size of the reactive alumina particles varying from 0.2 µm to 3 µm;

from calcined alumina, or a mixture of calcined aluminas, containing more than 99% $Al_2O_3$, the median size of the calcined alumina particles varying from 3 µm to 6 µm;

from fused-cast alumina in which the particles are of a size between 0.04 and 10 mm;

from tabular alumina in which the particles have a size lower than 10 mm;

from zircon $ZrSiO_4$;

from silica such as silica fume sold by Société Européenne des Produits Réfractaires. This vitreous silica contains over 93% silica ($SiO_2$), and is in the form of a powder in which the particles have a size between 0.1 and 5 µm and a median size of 0.5 µm.

Preferably, the particulate mixture of refractory particles comprises over 1%, over 3%, over 5% and/or less than 15% of reactive alumina or of a mixture of reactive aluminas containing over 99% $Al_2O_3$, the median size of the reactive alumina particles varying from 0.5 µm to 3 µm.

In an embodiment, the particulate mixture of refractory particles comprises over 1%, over 2%, over 3%, and/or less than 9%, less than 8%, less than 7% of silica fume.

Preferably, the median size of the silica particles is lower than 5 µm, preferably lower than 1 µm. Preferably, the particulate mixture of refractory particles comprises silica fume, preferably in a quantity between 3% and 5%, in percentage by weight in relation to the particulate mixture of refractory particles.

In an embodiment, the particulate mixture contains more than 1%, preferably more than 5%, even more preferably more than 7%, and less than 10% of spherical particles, that is to say, having a sphericity higher than 0.8, preferably higher than 0.9, non-granulated. Preferably, these spherical particles have a median size equal to or higher than 0.1 µm and equal to or lower than 2 mm, preferably equal to or lower than 1 mm, preferably equal to or lower than 100 µm, even more preferably equal to or lower than 1 μm, the relative standard deviation of the sizes of the non-granulated spherical particles, measured by the ratio of the standard deviation to the mean of said distribution, preferably being lower than 100%, preferably lower than 60%, even more preferably lower than 10%, as described in FR2894957. Preferably, said non-granulated spherical particles contain more than 90%, preferably more than 95%, preferably more than 99% of alumina, for example an Admatech 0502 powder of spheroidal particles supplied by Admatech, having a median diameter of 2 μm.

Preferably, the particulate mixture of refractory particles has a particle size distribution curve such that:

$D_{99.5}$<12 mm, preferably $D_{99.5}$<10 mm, preferably $D_{99.5}$<8 mm, preferably $D_{99.5}$<6 mm, preferably $D_{99.5}$<5 mm and/or, $D_{50}$>50 μm, preferably $D_{50}$>100 μm and $D_{50}$<500 μm, preferably $D_{50}$<400 μm, and/or $D_{10}$>0.5 μm, preferably $D_{10}$>0.8 μm and $D_{10}$<20 μm, preferably $D_{10}$<10 μm.

Even more preferably, $D_{99.5}$<12 mm, preferably $D_{99.5}$<10 mm, preferably $D_{99.5}$<8 mm, preferably $D_{99.5}$<6 mm, preferably $D_{99.5}$<5 mm, and $D_{50}$>50 μm, preferably $D_{50}$>100 μm and $D_{50}$<500 μm, preferably $D_{50}$<400 μm, and $D_{10}$>0.5 μm, preferably $D_{10}$>0.8 μm and $D_{10}$<20 μm, preferably $D_{10}$<10 μm.

FR 2 937 636 provides examples of particle size distribution that may be suitable for the manufacture of self-castable unshaped products.

Preferably, the binder is suitable for imparting a bond, preferably a hydraulic bond. As examples of usable binders, mention can be made, in a nonlimiting manner, of:

temporary organic binders (that is to say, removed entirely or partially during the sintering), such as resins, derivatives of cellulose or lignone, such as carboxymethylcellulose, dextrin, gelatin, alginates, tyloses, pectin;

chemical setting agents, such as phosphoric acid, aluminum monophosphate, ethyl silicate, colloidal silica, alumina hydrates, in particular Alphabond 300 sold by Almatis;

hydraulic setting agents, such as Portland cements and alumina cements, of the lime aluminate type such as CA25 cement, CA14 cement or CA270 cement.

By chemical reaction or by modifying the temperature, the binder serves to increase the viscosity in order to cause setting.

Preferably, the binder is a hydraulic binder (or "hydraulic cement") which, during activation, causes hydraulic setting and hardening, generally at ambient temperature.

Preferably, the alumina content of the hydraulic cement is higher than 60% by weight. Even more preferably, the hydraulic cement contains, as main components, alumina and calcium aluminates.

The hydraulic cement may in particular be an alumina cement or a mixture of various cements. To limit the lime (CaO) content, it is preferable to use a high-alumina cement, such as CA25 cement from Almatis. CA25 cement contains more than 78% $Al_2O_3$ and less than 19% CaO. The CA25 cement particles have a median size of about 8 μm.

Preferably, the quantity of binder, and in particular of hydraulic cement, is higher than 2%, or even higher than 3%, or even higher than 4%, and/or lower than 8%, preferably lower than 7%, in percentage by weight in relation to the dry material of the unshaped product. Preferably, the unshaped product further comprises a surfactant, preferably in a proportion by weight, in relation to the dry material, of 0.01% to 1%, preferably in a quantity higher than 0.02%, or even higher than 0.05%, or even higher than 0.1%, and/or lower than 0.5%, preferably even lower than 0.4%. The role of this surfactant is in particular to modify the rheological properties of the unshaped product to facilitate the pumping thereof. Use is preferably made of surfactants of the modified polycarboxylate type, preferably of the modified ether polycarboxylate type, even more preferably based on polyethylene glycol.

Preferably, the unshaped product further comprises a set accelerator, preferably in a proportion of 0.01% to 0.15%, in percentage by weight in relation to the dry material of the unshaped product. Such set accelerators are known per se by the skilled person, for example, Silubit BL05, sold by Zschimmer and Schwarz.

The castability of the unshaped product depends on the quantity of water introduced and on the particle size distribution of the particles of the particulate mixture.

The unshaped product comprises a quantity of water preferably higher than 4.5%, or higher than 5%, or higher than 6%, and/or lower than 9%, lower than 8%, lower than 7%, in percentage by weight in relation to the weight of the particulate mixture of refractory particles and the binder.

The addition of water activates the binder, in particular the hydraulic cement, that is to say, causes the initiation of setting.

The unshaped product may comprise fibers, in particular having a mean length of between 10 and 24 mm, for example fibers of polypropylene, polyacrylonitrile or polyvinyl alcohol. In a preferred embodiment, to improve the castability, the unshaped product does not contain fibers.

After the addition of water, the unshaped product has a segregation layer, as defined below, having a thickness "e" lower than 7 mm, preferably lower than 5 mm, preferably lower than 4 mm, preferably lower than 3 mm.

Degassing is an operation in which the unshaped product is placed under negative pressure, in order to facilitate the generation of bubbles and their extraction. This operation, known per se, serves to extract a portion of the air dissolved or imprisoned in the unshaped product, and therefore limits the subsequent generation of bubbles, in particular during hardening.

Degassing is preferably carried out in a chamber under partial vacuum, preferably in an apparatus different from the mixer. Preferably, the pressure in the chamber is lower than 0.2 Pa, preferably lower than 0.1 Pa.

The complete degassing time, including the time to feed the vacuum chamber and the holding time of the unshaped product in said chamber, may be between 1 and 20 minutes, or even between 1 and 15 minutes per unit of 600 kg of unshaped product introduced. In other words, the complete degassing time of a quantity of unshaped product equal to 1200 kg is preferably between 2 and 40 minutes, or even between 2 and 30 minutes.

In an embodiment, the unshaped product is transferred from the mixer to this apparatus by means of a pump.

The degassing apparatus is preferably a chamber into which the unshaped product is introduced. As described in the examples, the air is mainly removed when the unshaped product enters said chamber under partial vacuum.

The term "degassed" qualifies an unshaped product that has been subjected to a negative pressure, even if said degassing is not total.

The degassing apparatus is preferably mobile, and may be moved as required near the various molds to be filled. For example, it may be moved by means of a hoist or rails.

Preferably, the degassing apparatus is placed as close as possible to the injection point in the mold.

In an embodiment, the degassing is carried out on an unshaped product that is humidified, but substantially non-activated, for example after an addition of water but before the addition of a set accelerator. In step a), the degassing can thus be carried out before activation. Preferably, however, the degassing is carried on an activated unshaped product.

Step b): Preparation of the Mold

The mold intended for manufacturing a block according to the invention, or "infrastructure mold", can be manufactured in a conventional manner, using formwork.

Figure 2:
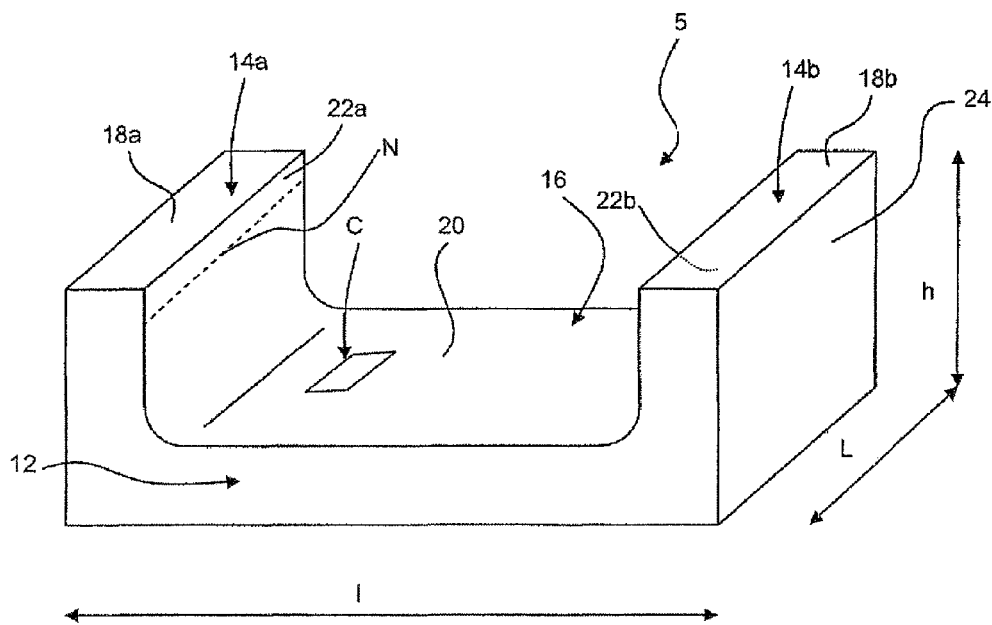
FIG. 2 shows a perspective view of a sintered infrastructure block of a feeder.

However, since the block is intended to be cast in situ and sintered in situ, it is preferable for at least part of the mold to consist of walls intended to remain in place after the block is cast. In particular, the outer surfaces of the feeder blocks (said outer surface has reference numeral 24 in FIG. 2) are conventionally thermally insulated. It is therefore advantageous to install said thermal insulation before manufacturing the block so that it can serve for the molding.

Figure 3:
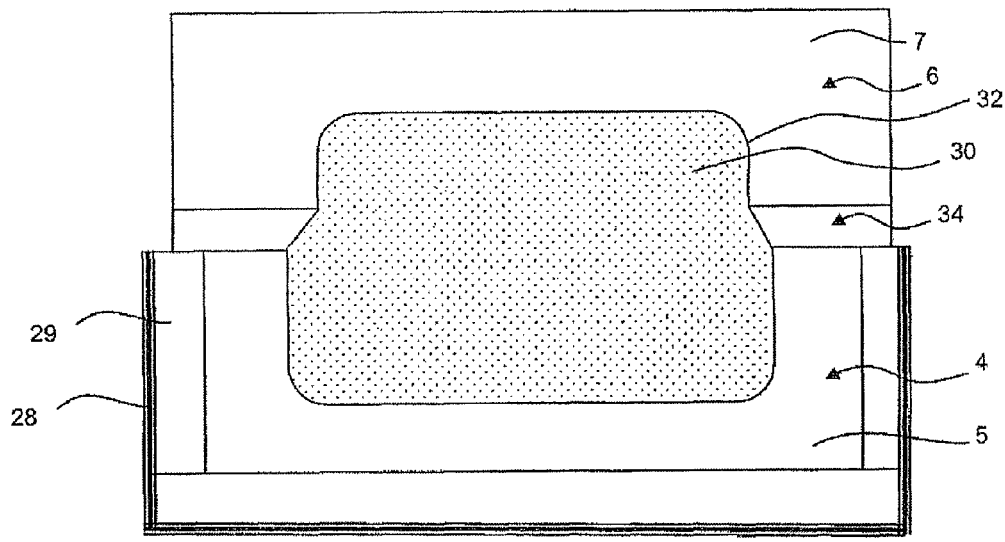
FIG. 3 shows a cross-section of an infrastructure block manufactured according to the invention, the core still being in place.

Similarly, to define a part of the mold, it is possible to use a separating layer, a concrete sub-layer, or a metal envelope 28, conventionally called "casing", conventionally separated from the block 5 by an insulating layer 29 (see FIG. 3).

Preferably, the infrastructure mold comprises a core 30 intended to impart the shape to the internal surface of the block 5 according to the invention to be manufactured (FIG. 3). Said internal surface consists, in FIG. 2, of the bottom surface 20 and the internal surfaces 22a and 22b of the jambs. Said core may also be adapted to impart the shape to the internal surface 32 of the superstructure block 7, for example U-section, placed above said block 5. In other words, the core 30 which has served for manufacturing an infrastructure block can then be used, without needing to be moved, to manufacture the superstructure block placed above said infrastructure block. The manufacture of the feeder is thereby advantageously accelerated.

Preferably, the core, and more generally the portion of the mold intended to define a surface of the block intended to come into contact with molten glass, called "contact surface", is adapted to be able to eliminate, at least partially, preferably substantially completely, the bubbles that rise from the unshaped product placed in the mold and reach the surface of the mold intended to bound the contact surface.

Preferably, this portion of the mold consists of:
- a core comprising or covered by at least one drainage layer (that is to say, allowing removal of the bubbles) and/or consisting or a drainage material,
- a core suitable for establishing a negative pressure at the interface with the unshaped product, in order to obtain a draining action, or
- a core having a shape suitable for eliminating a portion of said bubbles, or
- a core having a combination of these features.

In an embodiment, the drainage layer is a formwork liner, for example a lining of Zemdrain®.

The drainage region of the core extends at least in such a way as to define the contact surface.

In particular, a porous core, by permeability, serves to reduce, or even to eliminate, the bubbles of the unshaped product with which it comes into contact. In an embodiment, the core is made from expanded polystyrene.

Figure 5:
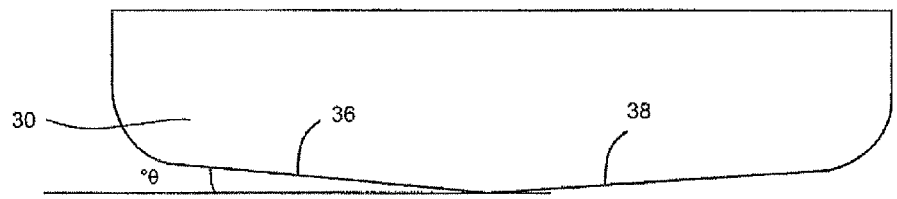
FIG. 5 shows a core having a shape suitable for eliminating a portion of the bubbles.

To have a shape suitable for eliminating the bubbles, the core preferably comprises, in the portion intended to define the bottom surface 20, a surface inclined to the horizontal by an angle θ preferably higher than 1°, higher than 2°, higher than 3°, higher than 4°, and/or preferably lower than 6° or lower than 5°. The core 30 shown in FIG. 5 thus comprises two substantially planar surfaces 36 and 38, inclined by angle θ of 5° to the horizontal serving to define a V-shaped bottom surface.

Step c): Mold Feed

The mold is supplied by bottom-feed.

For this purpose, the self-castable unshaped product, activated and degassed, can penetrate into the mold via a conduit of which the free end terminates close to the bottom of the mold at the start of the filling operation, and is then maintained in the product already filling the mold. Preferably, a pump is used to introduce the product into the mold.

Unlike a conventional filling, whereby the unshaped product is poured into the mold, conventionally from a chute, bottom-feed limits the introduction of air into the product during the supply of the mold.

The filling continues up to the desired level.

The degassing of the unshaped product before its introduction into the mold can only be partial. Bubbles in fact continue to rise and can in particular reach the surface of the mold defining the surface of the block intended to come into contact with molten glass. As explained above, this mold surface is adapted so that at least some of the bubbles reaching it are eliminated.

Step d): Hardening

Preferably, the unshaped product introduced by bottom-feed undergoes no operation before its hardening, and in particular no vibration operation.

The activation of the binder, conventionally resulting from the addition of water, causes the setting and hardening of the unshaped product, which is converted to a preform.

Step e): Mold Release

Mold release corresponds to the removal of one or more of the mold walls. In particular, the core defining the internal surface of the block is removed or eliminated.

Step f): Heating-Up

Preferably, heating-up comprises a drying operation including a plateau at a temperature of between 80° C. and 150° C., during a period of between 12 hours and 48 hours, followed by a temperature rise to the service temperature of the feeder, typically between 1150° C. and 1450° C.

This results in the drying and sintering of the block.

Heating-up can also contribute to mold release, for example by causing the core to melt.

Manufacture of the Feeder

Figure 4:
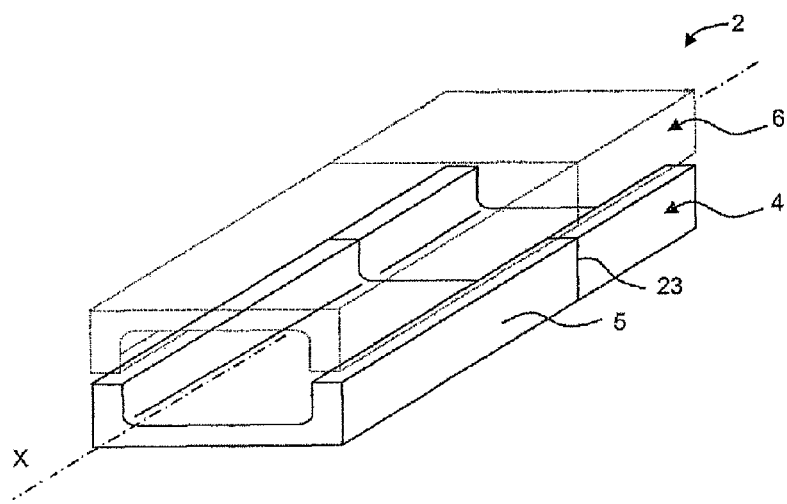

The method for manufacturing a block according to the invention described above serves to manufacture large blocks. In fact, these blocks do not need to be moved after having been manufactured. The number of joints 23 is therefore advantageously reduced as shown in FIG. 4.

The superstructure blocks may be blocks of the prior art.

In an embodiment, the superstructure blocks are also manufactured in situ, optionally by self-casting. However, the manufacturing requirements are less severe than for the infrastructure blocks; above all, because the superstructure blocks are not in contact with the molten glass; and also because the bubbles tend to rise, and therefore to move away from the internal surface of the superstructure blocks.

As shown in FIG. 3, after having manufactured one or more infrastructure blocks, one or more burner blocks 34 can be placed above the jambs of these blocks.

A mold is then installed having a shape suitable for manufacturing a superstructure block. As for the infrastructure mold described above, at least a portion of the superstructure mold may consist of an element that is not to be dismantled, for example an external formwork or an external insulation. Preferably, to bound the internal surface of a superstructure block, use is made of the core that has already served to bound the internal surface of the underlying infrastructure block. The rate of manufacture of the feeder is thereby advantageously accelerated.

An unshaped product is then cast in said superstructure mold.

The composition of the unshaped product used for manufacturing a superstructure block may be identical to or different from that used for manufacturing an infrastructure block.

The superstructure block may be manufactured by a method according to the invention or not. In particular, it is possible to use an unshaped product that is not a self-castable product.

A vibration step may be carried out.

The subsequent steps of hardening, mold removal, drying and sintering may be identical to those described above for manufacturing the infrastructure blocks.

The manufacture of the blocks can be carried out in a paced manner, with the manufacture of the superstructure blocks being carried out in accordance with the manufacture of the corresponding infrastructure blocks.

In an embodiment, operations proceed according to the following chronology:
 manufacture of the first infrastructure block;
 manufacture of the second infrastructure block and, above the first infrastructure block, of the first superstructure block;
 manufacture of the third infrastructure block and, above the second infrastructure block, of the second superstructure block;
 manufacture of the fourth infrastructure block and, above the third infrastructure block, of the third superstructure block;
 etc.

In another embodiment, operations proceed according to the following chronology:
 manufacture of all the infrastructure blocks;
 manufacture of all the superstructure blocks.

The manufacturing cores of the infrastructure and/or superstructure blocks can be removed zone by zone, after each manufacture of one or more blocks, or simultaneously during the heating-up of the feeder.

A portion (in the case of casting by zones) or the entirety of the feeder can be made following the method according to the invention.

Examples

The examples that follow serve to illustrate the invention in a nonlimiting manner.

Comparative example 1 is a BPAL feeder infrastructure block, sold by SAVOIE REFRACTAIRES, having a length L of 0.61 m.

Comparative example 2 is an unshaped product conventionally used for preparing glassmaking furnaces.

Said unshaped product was used as follows:
 50 kg of dry particulate mixture are introduced into a Bonnet planetary mixer. 10.1% of an aqueous solution of colloidal silica, in percentage by weight in relation to the particulate mixture, is then added. The entire mixture is then mixed for 15 minutes.

The unshaped product obtained is then introduced into a collecting hopper of a chamber isolated from the hopper by a butterfly valve.

The chamber is then placed under vacuum (0.08 Pa).

When ⅔ of the volume of the collecting hopper is filled with unshaped product, the valve connecting the hopper to the chamber is opened. The unshaped product can then flow and then be degassed as the chamber is filled, and the vacuum is maintained in the chamber by a diaphragm pump.

If necessary, the collecting hopper continues to be supplied as concrete is transferred into the chamber. However, it is necessary to ensure that the vacuum between the chamber and the hopper is not broken as long as the filling is underway.

Once the container is filled with the quantity of unshaped product corresponding to the volume of the block to be cast, the vacuum is broken.

The mold has the shape of a U-section infrastructure block of a feeder. The core of the mold serving to produce the contact surface is made from expanded polystyrene.

The chamber is installed above one of the jambs of the mold.

The bottom of the chamber is connected to a discharge pipe 50 mm in diameter and 500 mm long, of which the free end is closed by a plug. Said free end is placed in direct contact with the bottom of the mold. The plug is then removed and recovered. The unshaped product, activated and degassed, flows under its own weight thanks to its self-castability properties. The mold is filled in about 4 minutes. After setting, the preform is released from the mold.

After casting and setting, a preform is obtained.

The preform is released from the mold, then dried in an oven for 24 hours at 120° C.

The preform is then sintered in a kiln, according to the following cycle:
 temperature rise from 20° C. to 1300° C. at a rate of 30° C./h,
 plateau of 10 hours at 1300° C.,
 lowering to ambient temperature at a rate of 30° C./h.

Example 1 was manufactured as follows:

A particulate mixture comprising, in percentage by weight in relation to said particulate mixture, 94% of alumina (including 6% of calcined alumina, 10.5% of reactive alumina and 67% of tubular alumina) and 6% of a silica fume sold by Société Européenne des Produits Réfractaires, containing over 93% of silica ($SiO_2$) and in the form of a powder in which the particles have a size between 0.1 and 5 µm and a median size of 0.5 µm, is prepared in an RV11 intensive mixer sold by Eirich. The weight of said particulate mixture is 550 kg.

CA270 cement, in a quantity of 3% in relation to the particulate mixture, is added and the whole is mixed for 1 minute.

At the same time, a mixture consisting of water (4.9%), surfactant (0.03% of Castament® FS20, manufactured by BASF) and optionally a set accelerator (silubit BL05) is prepared using a stirrer attached to the end of a drill. The mixture time is 30 seconds. The mixture is poured on the particulate mixture of refractory particles. The whole is mixed for 15 minutes.

The self-castable unshaped product thus activated is then poured into the hopper of a Reed double piston pump, model B20hp, after lubrication of the pump discharge pipes using Primeapump sold by Lansdown Products.

The unshaped product obtained is then pumped from the hopper (the hopper allowing uniform feed of the pump pistons) and introduced into a collecting hopper of a chamber isolated from the hopper by a butterfly valve. This is followed by degassing, the bottom-feed of a U-section infrastructure mold, mold removal, drying and sintering, as in comparative example 2.

Contact Surface

The appearance of the surface to be in contact with the molten glass after mold removal (contact surface 16 at the feeder bottom) is considered to be satisfactory if:
when the length L is equal to or greater than 1 meter:
on any square C (FIG. 2) measuring 10 cm×10 cm, this surface has:
no more than one bubble having a diameter greater than 5 mm and
no more than 1 bubble having a diameter between 3 and 5 mm, and
no more than 22 bubbles having a diameter lower than 3 mm, and
per meter along the length L of this surface, said surface has:
no more than 2 bubbles having a diameter greater than 5 mm,
no more than 40 bubbles having a diameter between 3 and 5 mm, and
no more than 200 bubbles having a diameter lower than 3 mm, or
when the length L is lower than 1 meter, said surface has no more than 2 bubbles having a diameter greater than 5 mm, and no more than 40 bubbles having a diameter between 3 and 5 mm, and no more than 200 bubbles having a diameter lower than 3 mm.

The contact behavior for soda lime glass was evaluated by the following tests:

Corrosion Test

Corrosion by a soda lime glass was evaluated by a test consisting in contacting a bath of molten soda lime glass at 1300° C. with a vessel of which the walls consist of the samples to be tested, for a period of 51 days. Each sample has a length of 250 mm, a width of 50 mm and a height of 100 mm. During the test, the glass is not renewed. It is only supplemented to obtain a glass depth of 80 mm. At the end of the test, the volume corroded is evaluated for each sample by the following calculation:

The volume of sample is measured using a caliper before the test. The initial volume (Vi) is equal to the height×the width×50 mm.

To measure the final volume (Vf), a slice of the sample concerned is cut, substantially at mid-length of the samples, the length of the slice being 50 mm.

The final volume (Vf) is measured by double hydrostatic weighing of this slice: the slice is placed under vacuum and then soaked with water, weighed in air and in immersion; the difference in weights corresponds to the volume of the slice (buoyancy principle).

The corroded volume Vc is evaluated by the loss of volume during the test.

$$Vc = Vf - Vi$$

The ratio of the corroded volume of the sample to be evaluated $Vc_{ech}$ is related to that of the corroded volume of the reference example $Vc_{ref}$ (comparative example 1) to provide a corrosion resistance performance index, or "corrosion index", Ic, according to the formula:

$$I_C = \frac{Vc_{ech}}{Vc_{ref}} * 100$$

Thus, an index Ic higher than 100 represents a smaller corroded volume than the corroded volume of the reference example.

Stone Release Rest

The stone release test, which serves to assess the ability of a sintered refractory product to release stones in a molten soda lime glass is carried out as follows: a core of refractory product sintered to ¾ of its height (cylinder 10 mm in diameter and 80 mm in length) is tempered in a platinum crucible filled with molten soda lime glass and placed in a furnace at a temperature of 1300° C. The core is then extracted from the melt after a residence time of 72 hours in the molten glass. A drop of glass is formed at the end of the core. The quantity of stones released in the glass drop and in the glass remaining in the platinum crucible is compared with the quantities of known reference products and indexed from 0 to 5, an index of 0 corresponding to a stoneless glass and an index of 5 corresponding to the maximum of stones in the glass.

Good results of the stone release test correspond to a low scrap rate in the glass articles to be manufactured from the molten glass passing through a feeder manufactured with the tested sintered refractory product.

Castability

The castability was measured according to standard ASTM C1446-99 using a hollow truncated cone having bases of 70 and 100 mm and a height of 80 mm. Said cone is placed on a table, horizontally, on its major base. The unshaped product is poured into the cone, after having been mixed for 15 minutes. After waiting one minute to overcome potential thixotropy mechanisms, the cone is lifted in such a way that the unshaped product spreads naturally on the table, without vibration or any other energy input 5 minutes after spreading. A dimension of the layer of unshaped product thus obtained is measured, followed by measurement of the dimension of said layer perpendicular to said first dimension. The "castability" is the mean of these two measurements, in mm.

Segregation

The aptitude to segregation is evaluated by the following test: 25 kg of unshaped product are prepared in a mixture, with a mixing time of 15 minutes, and then poured into a previously oiled hopper, in the form of a truncated pyramid, placed with the apex downward, having a height of 320 mm, a top square inlet section of 350 mm×350 mm and a bottom square outlet section of 130×130 mm initially closed by a trapdoor.

The trapdoor of the hopper is then opened suddenly and the unshaped product pours out under its own weight, through the outlet opening, into the upper end (700 mm from the ground) of a previously oiled straight semi-circular PVC gutter, having a diameter of 170 mm and a length of 1600 mm, the bottom end of the gutter being at 380 mm from the ground.

The unshaped product pours into the gutter and falls into a mold placed under the gutter, below the bottom end of the gutter. The mold is a wooden mold measuring 250 mm×150 mm×150 mm, having a filling cross-section of 150 mm×150 mm, oiled and placed horizontally on the ground.

This is followed by waiting until the unshaped product hardens in the form of a block.

After stoving at 110° C. for 24 hours, the block is sawed in two via its center, thereby exposing two sawed faces with a cross-section of 250 mm×150 mm. Segregation causes the largest grains to migrate away from the upper face of the block. The aptitude to segregation is evaluated by the thickness (e) of the superficial laitance layer extending from the upper face of the block (measurable on the sawn faces). This layer is also called the "segregation layer". The aptitude to segregation is considered to be unacceptable when the thickness (e) of the laitance layer is higher than 7 mm.

Table 1 below summarizes the results obtained:

TABLE 1

|  | Comparative Example 1: sintered BPAL | Comparative example 2: non-castable unshaped | Example 1 according to the invention |
|---|---|---|---|
| Characteristics of unshaped product | | | |
| Bonding agent | 3% CA25 cement | Colloidal silica | 3% CA270 cement |
| $D_{99.5}$ (μm) | 3000 | >5250 | 3000 |
| $D_{50}$ (μm) | 200 | Between 100 and 250 | 200 |
| $D_{10}$ (μm) | 1 | <2 | 1 |
| water (%) | 4.3% | 9% (mixture of water + colloidal silica) | 4.9% |
| Castability (mm) | — | 290 | 330 |
| Segregation e (in mm) | — | 10 | 3 |
| Characteristics of sintered product | | | |
| % $Al_2O_3$ | 93 | 42.6 | 92.5 |
| % $SiO_2$ | 6 | 22 | 6.4 |
| % $ZrO_2$ | — | 35.2 | — |
| % CaO | 0.6 | 0.05 | 0.9 |
| % other | 0.4 | 0.15 | 0.2 |
| Density (g/cm³) | 3.10 | 3.25 | 3.06 |
| Open porosity (%) | 15 | 19.7 | 16 |
| Surface appearance (10 × 10 cm² zone) | | | |
| No. of bubbles Ø 5 mm | 0 | 11 | 0 |
| No. of bubbles 3 < Ø < 5mm | 0 | 7 | 1 |
| No. of bubbles Ø < 3 mm | 11 | 0 | 12 |
| Appearance of glass contact surface (total number of bubbles) | | | |
| No. of bubbles Ø 5 mm | 0 | 260 | 0 |
| No. of bubbles 3 < Ø < 5 mm | 0 | 400 | 7 |
| No. of bubbles Ø < 3 mm | 20 | 100 | 48 |
| Corrosion index | 100 | 71 | 96 |
| Stone release | 0 to 1 | 5 | 0 to 1 |

Table 1 shows that the unshaped product of example 1 according to the invention:
- does not have an aptitude to segregation, contrary to the product of comparative example 2,
- yields a sintered product having a satisfactory surface appearance, despite the less favorable casting conditions than those obtaining in the factory,
- yields a sintered product having a corrosion resistance that is substantially identical to that of comparative example 1 and much higher than that of comparative example 2.

The unshaped product of example 1 was converted to a sintered product following various casting techniques. Table 2 summarizes the results obtained:

TABLE 2

|  | Degassed product, gravity cast | Degassed product, bottom-feed cast, solid core (non-porous) | Degassed product, bottom-feed cast, expanded polystyrene core | Degassed product, bottom-feed cast, solid core covered by a Zemdrain ® drainage layer | Degassed product, gravity cast, solid core covered by a Zemdrain ® drainage layer |
|---|---|---|---|---|---|
| Surface appearance (10 × 10 cm² zone) | | | | | |
| No. of bubbles Ø > 5 mm | 30 | 8 | 0 | 0 | 2 |
| No. of bubbles 3 < Ø < 5 mm | 50 | 5 | 1 | 1 | 5 |
| No. of bubbles Ø < 3 mm | >200 | >100 | 12 | 11 | >100 |
| Appearance of glass contact surface (total number of bubbles) | | | | | |
| No. of bubbles Ø > 5 mm | 200 | 50 | 0 | 0 | 10 |
| No. of bubbles 3 < Ø < 5 mm | 330 | 30 | 7 | 7 | 30 |
| No. of bubbles Ø < 3 mm | 1350 | 670 | 48 | 44 | 680 |
| Length L (m) | 0.61 | 0.61 | 0.61 | 0.61 | 0.61 |

Table 2 shows the positive effect, for a self-castable product, of:
- degassing the unshaped product before casting, and
- bottom-feed casting of the unshaped product, and
- using a drainage layer and/or a core comprising at least one layer porous at the surface, or completely porous in its body (here an expanded polystyrene core).

As it now clearly appears, a manufacturing method according to the invention serves to manufacture, by self-casting in situ an infrastructure block of a molten glass feeder having performance in terms of resistance to corrosion by soda lime glass and stone release substantially identical to that of a product conventionally manufactured in the factory and sintered in a kiln. Advantageously, it is thus possible to manufacture large blocks, thereby limit the number of joints, and therefore increase the service life of the feeder.

Self-casting in situ also serves to increase the manufacturing rate of the feeder.

Obviously, the present invention is not limited to the embodiments described and provided as illustrative and nonlimiting examples.

The invention claimed is:

1. A method for manufacturing a block of an infrastructure of a feeder for a glassmaking furnace, the infrastructure comprising a block self-cast in situ and sintered in situ, said method comprising:
   a) preparation of a self-castable unshaped product, activated and degassed under partial vacuum,
   b) preparation, at the place where said block is intended to be used, of a mold corresponding to the shape of said block,
   c) bottom feed of the mold, with at least partial removal of bubbles located at the surface of said self-castable unshaped product, activated, degassed and introduced into said mold, corresponding to the surface of said block intended to come into contact with molten glass;
   d) hardening of said self-castable unshaped product, activated, degassed and introduced into said mold in order to form a preform;
   e) optionally, mold release of said preform;
   f) heating-up in order to dry and sinter said preform.

2. The manufacturing method as claimed claim 1, in which, in step c), bubbles are removed so that surface of the block intended to be in contact with molten glass has:
   if the length (L) of the block is equal to or greater than 1 m,
      on any square C measuring 10 cm×10 cm:
         no more than one bubble having a diameter greater than 5 mm and
         no more than 1 bubble having a diameter between 3 and 5 mm, and
         no more than 22 bubbles having a diameter lower than 3 mm, and
      per meter along the length of this surface:
         no more than 2 bubbles having a diameter greater than 5 mm, and
         no more than 40 bubbles having a diameter between 3 and 5 mm, and
         no more than 200 bubbles having a diameter lower than 3 mm, or
   if the length (L) is lower than 1 meter,
      no more than 2 bubbles having a diameter greater than 5 mm, and
      no more than 40 bubbles having a diameter between 3 and 5 mm, and
      no more than 200 bubbles having a diameter lower than 3 mm.

3. A method for manufacturing a feeder for a glassmaking furnace comprising the following steps:
   A. manufacture, using a manufacturing method as claimed in claim 2, of an infrastructure block comprising a base and two jambs;
   B. optionally, assembly of one or more burner blocks above at least one of said jambs;
   C. installation of a mold having a shape adapted to the manufacture of a superstructure block;
   D. casting of an unshaped product in said superstructure mold.

4. The method as claimed in claim 3, in which an infrastructure block and a superstructure block are manufactured simultaneously by casting.

5. The method as claimed in claim 3, in which a core used to define an internal surface of said infrastructure block is used to define an internal surface of a superstructure block placed above said infrastructure block.

6. The manufacturing method as claimed in claim 3, in which each of the jambs extends from said base to a free end bounded by an upper surface having the appearance of a casting face.

7. The manufacturing method as claimed in claim 1, in which said block has the shape of a U-section.

8. The manufacturing method as claimed in claim 1, in which said block has a length, measured along the longitudinal direction (X) of the feeder, that is greater than 0.7 m.

9. The manufacturing method as claimed in claim 8, in which said length is greater than 1 m.

10. The manufacturing method as claimed in claim 9, in which said length is greater than 2 m.

11. The manufacturing method as claimed in claim 10, comprising a casing in which said block is placed, said length being equal to the length of said casing.

12. The manufacturing method as claimed in claim 1, in which said block comprises grains and a hydraulic binder.

13. The manufacturing method as claimed in claim 12, in which the alumina cement content is higher than 2% and lower than 8%, in percentage by weight in relation to the oxides.

14. The manufacturing method as claimed in claim 1, in which said block has a composition such that the total $Al_2O_3+ZrO_2+SiO_2+CaO+MgO+TiO_2+Y_2O_3$ content is higher than 90%, in percentage by weight in relation to the oxides.

15. The manufacturing method as claimed in claim 14, in which said block has a composition such that the total $Al_2O_3+SiO_2+CaO+Y_2O_3$ content is higher than 90%, in percentage by weight in relation to the oxides.

16. The manufacturing method as claimed in claim 15, in which said composition is such that, in relation to the weight of the oxides and for a total of 100%:
   $Al_2O_3>80\%$,
   $SiO_2<10\%$,
   $CaO<5\%$,
   $Y_2O_3<5\%$,
   other oxides <5%.

17. The manufacturing method as claimed in claim 1, in which said block has a composition such that the total $Al_2O_3+ZrO_2+SiO_2+CaO+Y_2O_3$ content is higher than 90%, in percentage by weight in relation to the oxides.

18. The manufacturing method as claimed in claim 17, in which said composition is such that, in relation to the weight of the oxides and for a total of 100%;

$Al_2O_3 > 45\%$,
$25\% > SiO_2 > 5\%$,
$35\% > ZrO_2 > 8\%$,
$CaO < 5\%$,
$Y_2O_3 < 5\%$,
other oxides $< 5\%$.

\* \* \* \* \*